United States Patent [19]

Sumida et al.

[11] Patent Number: 5,630,400

[45] Date of Patent: May 20, 1997

[54] FUEL INJECTION VALVE FOR AN INTERNAL COMBUSTION ENGINE

[75] Inventors: Mamoru Sumida; Norihisa Fukutomi, both of Tokyo; Tsuyoshi Munezane, Kobe; Keita Hosoyama, Tokyo, all of Japan

[73] Assignee: Mitsubishi Denki Kabushiki Kaisha, Tokyo, Japan

[21] Appl. No.: 633,164

[22] Filed: Apr. 16, 1996

[30] Foreign Application Priority Data

Oct. 17, 1995 [JP] Japan ................. 7-268820

[51] Int. Cl.$^6$ ............................................. F02M 55/02
[52] U.S. Cl. ..................................................... 123/470
[58] Field of Search ............................ 123/470, 468–9; 239/600

[56] References Cited

U.S. PATENT DOCUMENTS

| | | | |
|---|---|---|---|
| 3,776,209 | 12/1973 | Wertheimer et al. | 123/470 |
| 3,841,277 | 10/1974 | Schafer | 123/470 |
| 4,201,172 | 5/1980 | Jaggle et al. | 123/470 |
| 4,203,402 | 5/1980 | Freyn | 123/470 |
| 4,294,215 | 10/1981 | Hans et al. | 123/470 |
| 4,492,201 | 1/1985 | Radaelli | 123/470 |
| 4,519,371 | 5/1985 | Nagase et al. | 123/470 |
| 4,528,959 | 7/1985 | Hauser, Jr. | 123/470 |
| 4,647,012 | 3/1987 | Gartner | 123/470 |
| 4,757,789 | 7/1988 | Laine | 123/470 |
| 5,044,340 | 9/1991 | Robnett | 123/470 |

FOREIGN PATENT DOCUMENTS 7-30368  6/1995  Japan.

*Primary Examiner*—Thomas N. Moulis
*Attorney, Agent, or Firm*—Sughrue, Mion, Zinn, Macpeak & Seas

[57] ABSTRACT

A direct injection fuel injection valve includes a valve assembly 6, a hollow housing 14 having a coupling portion 16 coupled to the valve assembly and adapted to be connected to the fuel supply pipe 5, and a solenoid assembly 22 disposed for operating the valve assembly. The housing has an abutting surface 36 disposed at a position radially outward of the coupling portion with respect to the valve assembly and in an opposing relationship relative to a shoulder portion 3 of the fuel injection valve insertion hole 2, and a mounting surface 31 for positioning the housing relative to the cylinder head. A sleeve 40 is provided with one end disposed on the valve assembly in opposition to the shoulder portion of the cylinder head and the other end mounted to the housing in abutment against the abutting surface to bridge across the valve assembly and the housing over the coupling portion. A seal ring 45 having one side disposed on the valve assembly in abutment against the one end of the sleeve and the other side adapted to abut against the shoulder portion of the fuel injection valve insertion hole is provided.

13 Claims, 4 Drawing Sheets

FUEL INJECTION VALVE FOR AN INTERNAL COMBUSTION ENGINE

BACKGROUND OF THE INVENTION

This invention relates to a fuel injection valve for an internal combustion engine and, more particularly, to a direct injecting fuel injection valve for an internal combustion engine of the type mounted to an engine cylinder for directly injecting the fuel into the cylinder.

The direct injection type fuel injection valve, which is to be mounted to the internal combustion engine cylinder for directly injecting the fuel into the combustion chamber, is required to endure severe environmental conditions peculiar to the direct fuel injection. The performances required for enduring these environmental conditions include mechanical strength against the heat and the vibration of the cylinder, the high pressure of the combustion gas within the combustion chamber and mechanical strength against the elevated temperature as well as the sealing ability for the prevention of the leakage of the fuel and the combustion gas, the electric and magnetic properties and the corrosion resistivity against the chemical components and the residual components within the fuel and the combustion gas.

The typical structure of the direct injection fuel injection valve is such that a hollow injection valve main body in which a needle valve is accommodated is connected to a housing by the press-fit or the like and a solenoid is disposed within the housing for actuating the needle valve. The mounting of the fuel injection valve to the cylinder is usually achieved by inserting the injection valve main body into a bore provided in the cylinder head and by urging and attaching a housing of the injection valve against the cylinder head by means of the fuel supply pipe.

The direct injection fuel injection valve disclosed in Japanese Utility Model Laid-Open No. 7-30368 is designed for preventing the shrinkage of the axial length of the housing due to the mounting load acting on the fuel injection valve from influencing the lift stroke of the needle valve of the injection valve, and the fuel injection valve is inserted at the tip of the injection valve main body until it abuts against the bottom of the injection valve insertion hole provided in the cylinder head and axially urged against and fixed to the cylinder head. A gasket having a recess for receiving the tip of the injection valve main body therein is press-fit on the tip of the injection valve main body so that a clearance is defined between the bottom surface of the recess of the gasket and the tip of injection valve main body.

In this direct injecting fuel injection valve, the mounting load in the axial direction for mounting the fuel injection nozzle to the cylinder only causes the clearance between the gasket and the injection valve which are held together by the press-fit friction therebetween to decrease and does not cause the length dimension of the housing to be reduced to decrease the lift amount of the needle valve.

However, in this type of fuel injection valve in which the housing and the injection valve main body are connected together, the connection portion is inevitably subjected to a massive pressing force irrespective of the means of connection which may be press-fit, weld or caulking, often causing the strength of the connection portion to be insufficient, resulting in a difficulty in maintaining the precise lift stroke of the valve. This connection portion in the housing must at the same time be durable against the influences of the thermal expansion, the thermal displacement, the thermal shocks or the like due to the high temperature of the internal combustion engine. The housing is also required to have the sealing ability against the fuel and the combustion gas as well as to provide a magnetic circuit for the solenoid and, furthermore, the minimum dimensions are required for the light-weight and the compactness of the fuel injection valve.

SUMMARY OF THE INVENTION

Accordingly, one object of the present invention is to provide a direct injecting fuel injection valve for an internal combustion engine from which the above-discussed problems of the conventional direct injecting fuel injection valve are eliminated.

Another object of the present invention is to provide a fuel injection valve for an internal combustion engine which has a simple and compact structure easy to manufacture, a sufficient durability against severe environmental conditions to which the direct injecting fuel injection valve is exposed and which can maintain a high reliability and performance for a prolonged term.

Accordingly, the present invention resides in a fuel injection valve for an internal combustion engine having one end adapted to be inserted into a fuel injection valve insertion hole having a shoulder portion disposed in a cylinder head of the internal combustion engine and the other end adapted to be connected to a fuel supply pipe. The fuel injection valve comprises a valve assembly, a hollow housing having at one end thereof a coupling portion coupled to the valve assembly and at the other end adapted to be connected to the fuel supply pipe and a solenoid assembly disposed within the housing for opening and closing the valve assembly. The housing has an abutting surface disposed at a position radially outward of the coupling portion with respect to the valve assembly and in a opposing relationship relative to the shoulder portion of the fuel injection valve insertion hole and a mounting surface for positioning the housing relative to the cylinder head. The fuel injection valve also comprises a sleeve having one end disposed on the valve assembly in opposition to the shoulder portion of the cylinder head and the other end mounted to the housing in abutment against the abutting surface to bridge across the valve assembly and the housing over the coupling portion.

The fuel injection valve may preferably comprise a seal ring having one side disposed on the valve assembly in abutment against the one end of the sleeve and the other side adapted to abut against the shoulder portion of the fuel injection valve insertion hole. One side of the seal ring in abutment against one end of the sleeve may be positioned radially inward of the other side of the seal ring adapted to be abut against the shoulder portion of the fuel injection valve insertion hole. The seal ring may be a metal ring having a substantially S-shaped cross-section, may comprise a plated tin layer on the surface and a projection substantially radially inwardly extending from an inner circumferential surface of the seal ring and elastically engaging with the valve assembly.

The coupling portion of the housing for coupling with the valve assembly may comprise a welded or caulked portion of the housing caulked against the valve assembly, and the mounting surface for positioning the housing relative to the cylinder head may comprise a mounting flange disposed to the housing, the fuel injection valve may be fixedly mounted to the cylinder head through the mounting flange. The sleeve may be press-fit, welded or caulked on an outer circumferential surface of the valve assembly.

The fuel injection valve may preferably comprise a highly heat conductive material filled within a space defined within the sleeve by the valve assembly and the housing. The sleeve may be heat-resistive and erosion-resistive.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE REFERRED EMBODIMENTS

Figure 1:
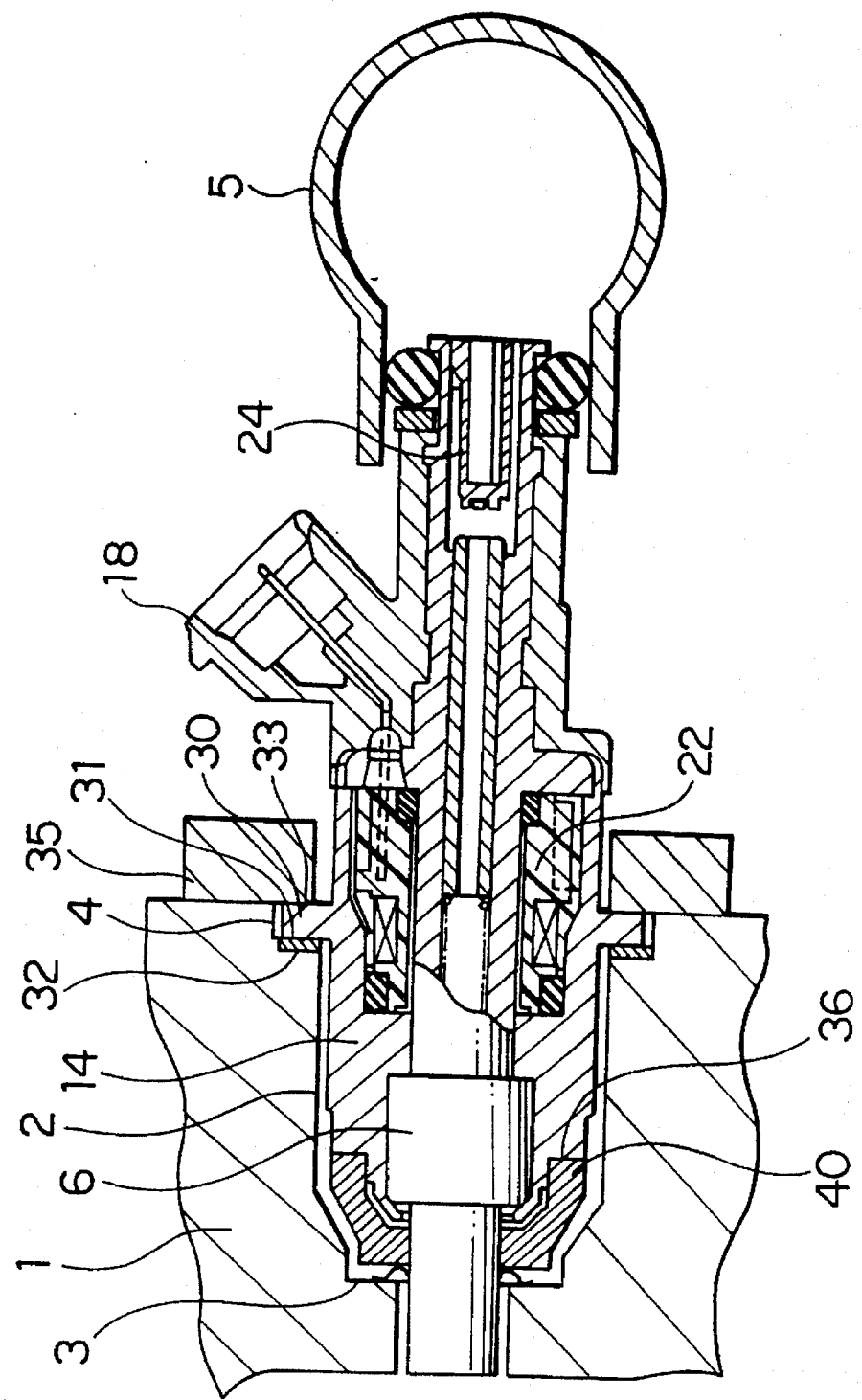
FIG. 1 is sectional side view of the fuel injection valve for an internal combustion engine of the present invention in the state mounted to a cylinder head of an internal combustion engine.
Figure 2:
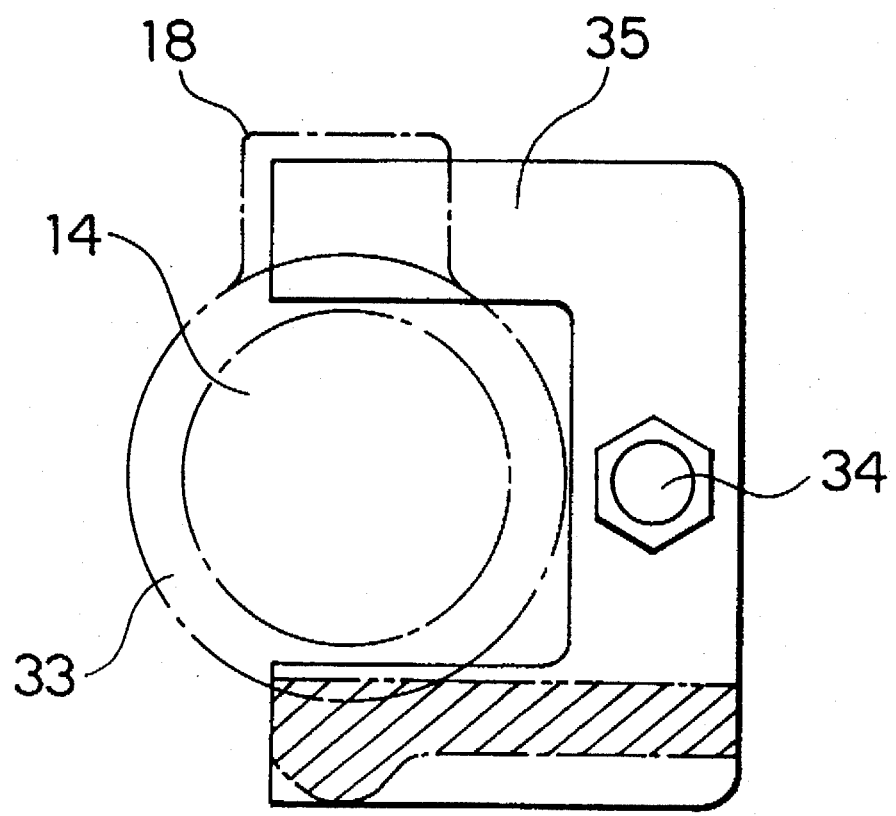
FIG. 2 is a front view showing the fork member used in mounting the fuel injection valve of the present invention shown in FIG. 1.

FIGS. 1 and 2 illustrate the state in which the direct injecting fuel injection valve of the present invention is mounted to a cylinder head of an internal combustion engine. A cylinder head 1 of an internal combustion engine has formed therein an injection valve insertion hole 2 extending through the wall of the cylinder head 1 for receiving therein the direct injecting fuel injection valve. The injection valve insertion hole 2 is a stepped hole or bore having a circular cross-section and a shoulder portion 3 in the intermediate portion thereof, and a positioning counter sink 4 is formed in an outer end on the side of the outer surface of the cylinder head 1. The direct injecting fuel injection valve of the present invention is inserted into and mounted to the injection valve insertion hole 2 at its one end or tip, and the other end which projects from the injection valve insertion hole 2 is connected to a fuel supply pipe 5.

Figure 3:
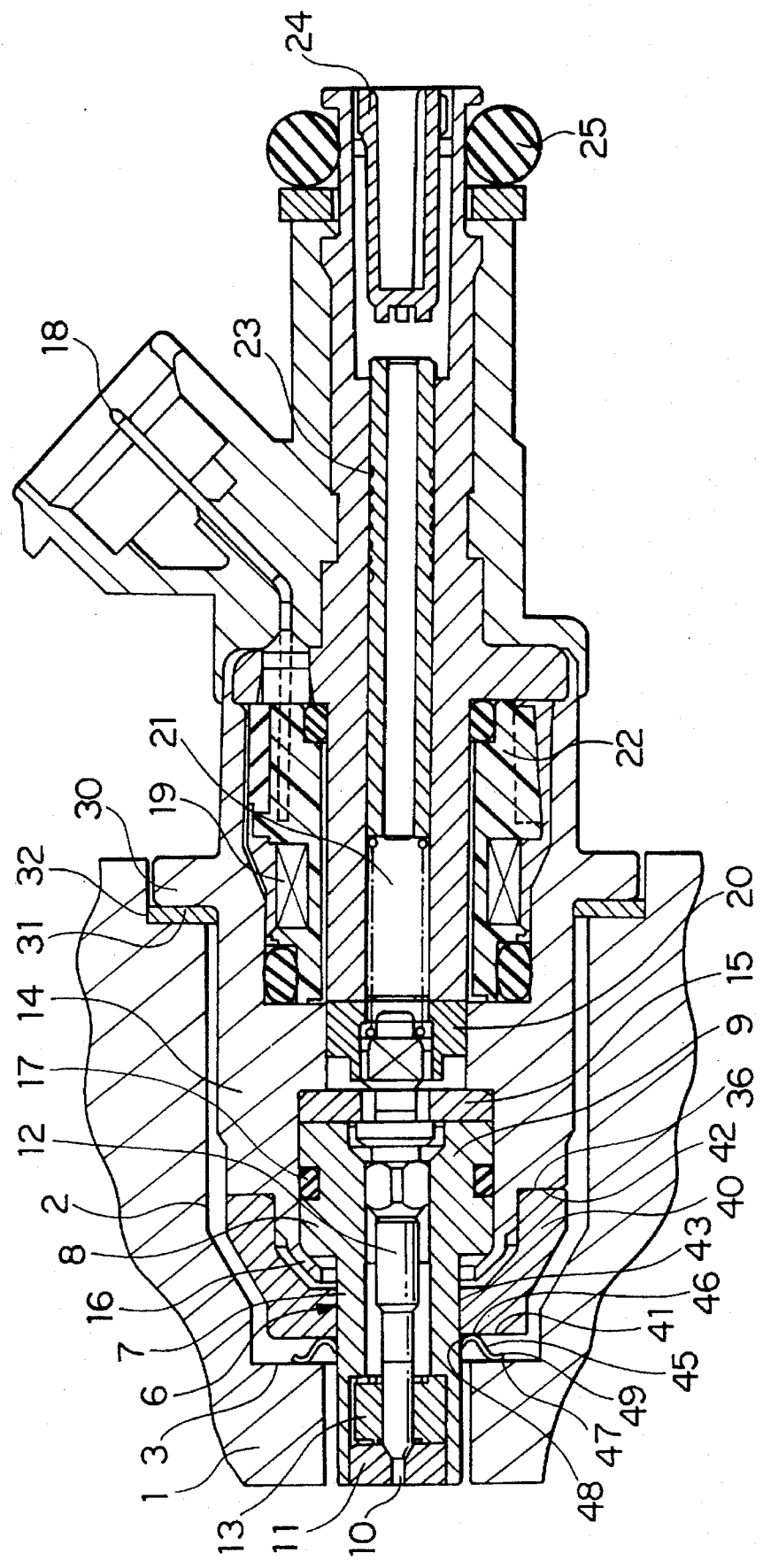
FIG. 3 is a sectional side view of the fuel injection valve of the present invention.

As best shown in FIG. 3, the fuel injection valve comprises at its tip a valve assembly 6. The valve assembly 6 comprises a valve main body, 9 of a hollow stepped cylindrical shape having a small-diameter cylinder portion 7 and a large-diameter cylinder portion 8, a valve seat 11 secured to one end of the central bore of the valve main body 9 and having a fuel injection hole 10, a needle valve 12 capable of contacting and separating with respect to the valve seat 11 for opening and closing the fuel injection hole 10, and a swirler 13 for guiding the needle valve 12 in the axial direction and for providing a swirling movement to the fuel flowing radially inwardly into the fuel injection hole 10 of the valve seat 11.

The valve assembly 6 is inserted at its rear end or the large-diameter portion 8 into one end of a hollow cylindrical housing 14 until it is positioned within the housing 14 through a spacer 15 and is firmly attached and connected or coupled to the housing 14 by means of a coupling portion 16 which is a thin wall portion of the housing radially inwardly caulked against and on a shoulder portion of the housing 14 defined between the large-diameter cylinder portion 8 and the small-diameter cylinder portion 7. While the coupling portion 16 is the caulked portion in the illustrated embodiment, the present invention may equally be applicable to another structure including any other suitable coupling portion 16 between the housing 14 and the valve assembly 6, such as a welded portion (not shown). Between the outer circumferential surface of the large-diameter cylinder 8 and the inner circumferential surface of the housing 14, an O-ring 17 is inserted for the sealing therebetween.

Also disposed within the housing 14 are a coil 19 having a connector 18, an armature 20 capable of being driven by a magnetic flux generated when the coil 19 is energized and a solenoid assembly 22 including a spring 21 for returning the armature 20 to its initial position, the arrangement being such that the needle valve 12 of the valve assembly 6 is operable between the open and the closed position relative to the valve seat 11. The spring 21 of the solenoid assembly 22 is held in abutment with the end surface of the pipe 23 which is position-adjusted and secured thereat by caulking for example within the housing 14. The other end of the pipe 23 extends toward the rear or the other end of the housing to which the fuel supply pipe 5 is connected, where a filter 24 is disposed and an O-ring 25 is provided on the outer circumference of the filter 24 for the seal between the housing 14 and the fuel supply pipe 5 (see FIG. 1)

The housing 14 of the direct injection fuel injection valve of the present invention comprises a coupling portion 16 which may be the caulking portion caulked against the valve assembly 6, and the housing 14 has at its outer circumference a circumferentially extending flange 30. When the direct injection fuel injection valve is mounted to the cylinder head 1 as shown in FIGS. 1 and 2, the mounting surface 31 on the front side of the flange 30 is sealed against the counter sink 4 in the cylinder head 1 by means of a copper gasket 32, and the side surface 33 on the rear side of the flange 30 is firmly pressed so that the flange 30 is urged against the cylinder head 1 by the fork member 35 secured to the cylinder head 1 by a mounting bolt 34. Thus, the direct injection fuel injection valve is positioned by the mounting surface 31 provided on the housing 14 and is rigidly attached to the cylinder head 1.

The housing 14 is also provided with an annular abutting surface 36 extending in a plane perpendicular to the central axis of the direct injection fuel injection valve at a position opposing to and spaced apart by a predetermined axial distance from the shoulder portion 3 of the injection valve insertion hole 2 of the cylinder head 1. This abutting surface 36 is located radially outward of the coupling portion 16 or the caulked portion at which the housing 14 is connected to the valve assembly 6.

The direct injection fuel injection valve is further provided with a sleeve 40 disposed between the outer circumferential surface of the small-diameter cylinder 7 of the valve assembly 6 and the abutting surface 36 of housing 14. The sleeve 40 is a hollow, substantially truncated conical member having an annular first end face 41 and an annular second end face 42 which are parallel to each other and perpendicular to the central axis of the sleeve 40. The inner circumferential surface 43 adjacent to the first end face 41 is a cylindrical surface fitting to the outer circumferential surface of the small-diameter cylinder 7 of the valve assembly 6. The sleeve 40 is positioned on the small-diameter portion 7 of the valve assembly 6 at its inner circumferential surface 43 so that its one end or the first end face 41 is in opposition to the shoulder portion 3 of the injection valve insertion hole 2 of the cylinder head 1 and the other end or the second end face 42 is positioned in abutment against the abutting surface 36 of the housing 14 so that the coupling portion 16 between the housing 14 and the valve assembly 6 is bridged or bypassed in order to prevent the coupling portion 16 from being subjected to a force urging the fuel injection valve against the cylinder head 1.

The sleeve 40 may be made of a suitable metal having a sufficient mechanical strength and resistivity to heat and erosion such as stainless steel such as SUS304. The sleeve 40 is preferably made of a non-magnetic material in order not to make the magnetic circuit of the solenoid assembly 2 defined within the housing 14 unnecessarily long and make the magnetic reluctance minimum. While, in the illustrated embodiment, the inner circumferential surface 43 of the sleeve 40 is attached by press-fit on the outer circumference of the small-diameter cylinder 7 of the valve assembly 6, the sleeve 40 may be attached at some other portion by another suitable means as will be described later in detail.

The direct injection fuel injection valve also comprises a seal ring 45 fitted over the small-diameter cylinder 7 of the valve assembly 6. The seal ring 45 is an annular member having a substantially wave-formed or S-shaped cross-section and a general configuration having one or first side 46 and the other or second side 47 axially spaced apart from each other and an inner circumference edge 48 and an outer circumference edge 49 radially spaced apart from each other. The inner circumference edge 48 of the seal ring 45 is fitted on the outer circumference surface of the small-diameter cylinder 7 of the valve assembly 6 and its first side 46 is in abutment with the first end face 41 of the sleeve 40. The seal ring 45 is arranged such that its second side 47 abuts against the shoulder portion 3 of the injection valve insertion hole 2 when the direct injection fuel injection valve is mounted to the cylinder head 1 as shown in FIG. 1.

Since the seal ring 45 is wave-form in cross-section, the radial position at which its first side 46 abuts against the sleeve 40 and the radial position at which its second side 47 abuts against the shoulder portion 3 of the injection valve insertion hole 2 of the cylinder head 1 are different from each other. In the illustrated embodiment, the first side 46 which abuts against the first end face 41 of the sleeve 40 is positioned radially inward of the second side 47 which abuts against the shoulder portion 3 of the injection valve insertion hole 2. By this configuration and position of the seal ring 45, the space into which the high temperature and high pressure combustion gas within the cylinder can enter is made small to minimize the area exposed to the combustion gas, thereby reducing the undesirable influence of combustion gas.

When a force is applied to the direct injection fuel injection valve for some reason and the clearance defined between the first end face 41 of the sleeve 40 and the shoulder portion 3 of the injection valve insertion hole 2 which are in contact with the seal ring 45 is decreased, the seal ring 45 is deformed to shrink in the axial dimension but the amount of deformation of the curved portion in the waveform is slight. Therefore, when the seal ring 45 is being deformed, the curved portion of the seal ring 45 in contact with the sleeve 40 or the shoulder portion 3 moves in rolling motion on the sleeve 40 or the shoulder portion 3, so that the contact portion which linearly extends between the seal ring 45 and the sleeve 40 or the shoulder portion 3 is maintained during the deformation. Therefore, the seal ring 45 does not loose its sealing ability even when it is deformed and it returns to the original position when the load is removed.

Although not illustrated, the seal ring 45 may have projections radially inwardly extending from the inner circumferential edge of the seal ring 45. The number of projection may be one but it is preferable to provide three projections circumferentially spaced at equal intervals.

When the seal ring 45 is fitted over the outer circumferential surface of the small-diameter cylinder 7 of the valve assembly 6, the above projections elastically engage at a small pressure or are hooked at their tips with the outer circumferential surface, whereby the seal ring 45 is prevented from being dropped off from the valve assembly 6 owing to the elastic engagement and/or hooking of the projections when it is downwardly positioned during the assembly of the fuel injection valve or the mounting to the cylinder head 1.

When the direct injection fuel injection valve is mounted to the cylinder head 1 of the internal combustion engine as illustrated in FIGS. 1 and 2, the front end of the valve assembly 6 in which the fuel injection hole 10 is formed faces the combustion chamber and the seal ring 45 is inserted between the shoulder portion 3 of the injection valve insertion hole 2 and the first end face 41 of the sleeve 40.

The fuel supplied from the fuel tank (not shown) and pressurized by the pressurizing pump (not shown) is supplied through the fuel supply pipe 5 to the direct injection fuel injection valve. The fuel then flows through the filter 24, the spacer pipe 23 and the spring 21 and flows around the armature 20 of the solenoid assembly 22 to arrive at the valve assembly 6. The fuel flowed into the valve assembly 6 is not injected therefrom when the needle valve 12 is maintained by the spring 21 in a closed position shown in FIG. 1 in which the injection port 10 is closed.

When the solenoid assembly 22 is energized by an electric source (not shown) connected to the connector 18, the coil 19 generates a magnetic flux within a magnetic circuit formed around the coil 19 and including the housing 14, the armature 20 or the like, whereby the armature 20 is magnetically attracted and moved together with the needle valve 12 to the right in FIG. 1 against the spring force of the spring 21. When the needle valve 12 is thus receded from the valve seat 11, the fuel within the valve assembly 6 is given a swirling movement by the swirler 13 and injected into the combustion chamber of the internal combustion engine from the fuel injection port 10.

The direct injection fuel injection valve of the present invention is accurately and rigidly positioned with respect to the counter sink surface 4 of the cylinder head 1 by the mounting surface 31 of the flange 30 and firmly attached to the cylinder head 1 by means of the fork member 35 secured to the cylinder by the mounting bolt 34. Therefore, the pressure of the high-pressure combustion gas within the combustion chamber is supported by the fork member 35 through the flange 30 and no pressure acts on the fuel supply pipe 5 as in the conventional design.

Also, since the coupling portion 16 between the housing 14 and the valve assembly 6 of the direct injection fuel injection valve is covered with the sleeve 40, the coupling portion 16 is prevented from being directly influenced by a high pressure and a high temperature, generating no deformation nor damages.

Further, since the sealing between the cylinder head 1 and the direct injection fuel injection valve is achieved by the seal ring 45 under a pressure at a position relatively close to the front end of the direct injection valve between the shoulder portion 3 of the injection valve insertion hole 2 of the cylinder head 1 and the first end face 41 of the sleeve 40, the force compressing the seal is not transmitted to the coupling portion 16 and is directly transmitted to the abutting surface 36 of the housing 14 through the sleeve 40 and supported by the cylinder head 1 through the fork member 35. Therefore, no force acts on the coupling portion 16 which may be the caulked portion and the coupling portion 16 is prevented from being damaged.

Also, since the heat at the front end portion of the valve assembly 6 which may easily become high temperature due to small volume by a very high temperature provided from the combustion chamber is transmitted to the housing 14 through the sleeve 40 from the portion relatively close to the high-temperature front end, a thermal transmission path is provided, thereby preventing the valve assembly 6 from being damaged due to the high temperature.

Figure 4:
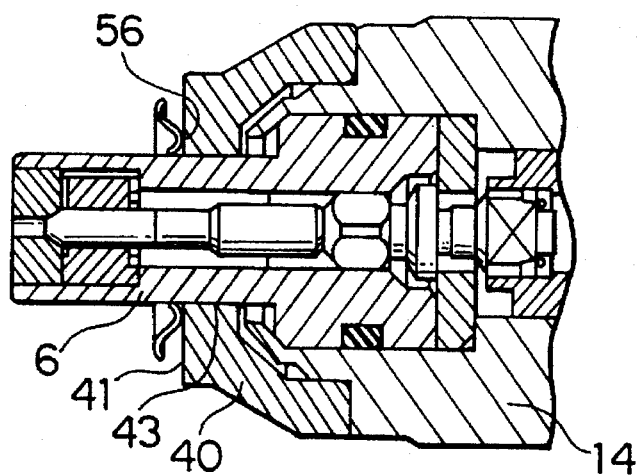
FIG. 4 is a fragmental sectional side view of the fuel injection valve of another embodiment of the present invention.

FIG. 4 illustrates another embodiment of the direct injection fuel injection valve of the present invention, in which the circumferential corner portion between the first end face 41 of the sleeve 40 and the inner circumferential surface 43 adjacent to the first end face 41 is sealed by a weld 56 continuously extending over the entire circumference on the outer circumferential surface of the small-diameter cylinder 7 of the valve assembly 6. When the seal is thus provided between sleeve 40 and the valve assembly 6, seal between the cylinder head 1 and the direct injection fuel injection valve becomes more reliable and strong. Also, the heat conduction from the valve assembly 6 to the housing 14 is much more improved.

Figure 5:
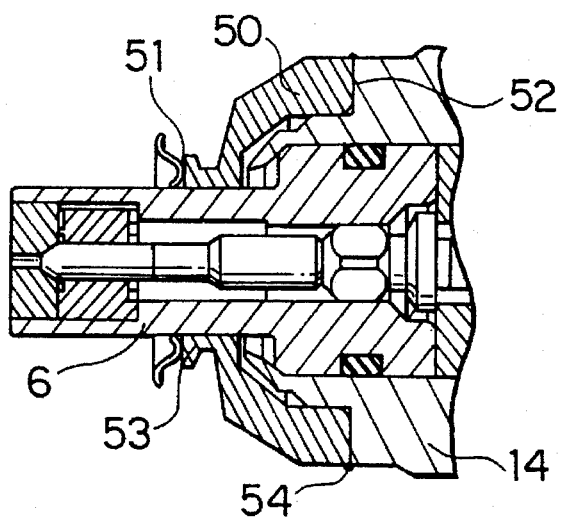
FIG. 5 is a fragmental sectional side view of the fuel injection valve of a still another embodiment of the present invention.

FIG. 5 illustrates another embodiment of the direct injection fuel injection valve of the present invention, in which, while the sleeve 50 has a second end face 52 of a configuration similar to that of the sleeve 40 shown in FIGS. 3 or 4, the end portion defining the first end face 51 has a reduced radial thickness and a caulked portion 53 in its outer circumference caulked against the outer circumferential surface of the small-diameter cylinder 7 of the valve assembly 6. With this structure, the sleeve 50 can be easily secured to the valve assembly by a simple operation. Also, the outer circumferential edge of the second end face 52 of the sleeve 50 may be secured to the housing 14 by a weld 54 as illustrated in FIG. 5.

Figure 6:
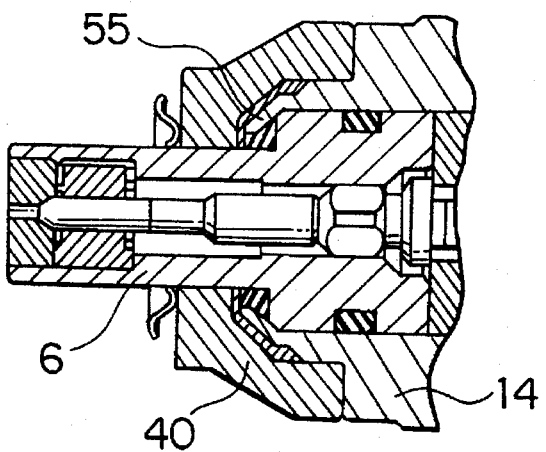
FIG. 6 is a fragmental sectional side view of the fuel injection valve of further embodiment of the present invention.

FIG. 6 illustrates still another embodiment of the fuel injection valve of the present invention, in which an annular space defined between the sleeve 40, the valve assembly 6 and the housing 14 is filled with a highly heat conductive material 55. Examples suitable for this material are bonding agent containing silver and an inorganic bonding agent containing alumina as its main component. With this construction, the heat conduction from the front end of the valve assembly 6 to the housing 14 is further improved and seal at this portion is significantly improved.

As has been described, the injection valve for an internal combustion engine, which has one end adapted to be inserted into a fuel injection valve insertion hole having a shoulder portion disposed in a cylinder head of the internal combustion engine and the other end adapted to be connected to a fuel supply pipe, comprises a valve assembly, a hollow housing having at one end thereof a coupling portion coupled to the valve assembly and at the other end adapted to be connected to the fuel supply pipe and a solenoid assembly disposed within the housing for opening and closing the valve assembly. The housing has an abutting surface disposed at a position radially outward of the coupling portion with respect to the valve assembly and in a opposing relationship relative to the shoulder portion of the fuel injection valve insertion hole and a mounting surface for positioning the housing relative to the cylinder head. The fuel injection valve also comprises a sleeve having one end disposed on the valve assembly in opposition to the shoulder portion of the cylinder head and the other end mounted to the housing in abutment against the abutting surface to bridge across the valve assembly and the housing over the coupling portion.

Therefore, the previously discussed problems of the conventional direct injecting fuel injection valve are eliminated, and the fuel injection valve for an internal combustion engine can be made simple and compact in structure and easy to manufacture, sufficiently durable against a severe environmental conditions to which the direct injecting fuel injection valve is exposed and maintaining a high reliability and performance for a prolonged term.

What is claimed is:

1. A fuel injection valve for an internal combustion engine having one end adapted to be inserted into a fuel injection valve insertion hole (2) in a cylinder head (1) of the internal combustion engine, said hole having a shoulder portion (3). and another opposite other end adapted to be connected to a fuel supply pipe (5), said fuel injection valve comprising:

a) a valve assembly (6);

b) a hollow housing (14) having a coupling portion (16) at one end thereof coupled to said valve assembly and connected to the fuel supply pipe at an other, opposite end, said housing having an abutting surface (36) disposed at a position radially outward of said coupling portion with respect to said valve assembly and in an opposing relationship relative to said shoulder portion of the fuel injection valve insertion hole and a mounting surface (31) for positioning said housing relative to the cylinder head;

c) a solenoid assembly (22) disposed within said housing for opening and closing an injection valve (12) of said valve assembly; and d) a sleeve (40;50) having one end (41) disposed on said valve assembly in opposition to said shoulder portion of the cylinder head and another, opposite end 42) mounted to said housing in abutment against said abutting surface to bridge across said valve assembly and said housing over said coupling portion to prevent the coupling portion from being subjected to a force Urging the fuel injection valve against the cylinder head.

2). A fuel injection valve as claimed in claim 1, further comprising a seal ring (45) having one side (46) disposed on said valve assembly in abutment against said one end of said sleeve and another, opposite side (47) adapted to abut against said shoulder portion of the fuel injection valve insertion hole, wherein axial movements of Said one end of the housing, and attendantly the valve assembly, induced by temperature and pressure conditions within a cylinder of the engine, are accommodated by the sleeve and seal ring without affecting lift stroke of the injection valve.

3. A fuel injection valve as claimed in claim 1, wherein said coupling portion of said housing comprises a welded or caulked portion of said housing caulked against said valve assembly.

4. A fuel injection valve as claimed in claim 1, wherein said mounting surface for positioning said housing relative to said cylinder head comprises a mounting flange (30) disposed on said housing, said fuel injection valve being fixedly mounted to said cylinder head through said mounting flange.

5. A fuel injection valve as claimed in claim 1, wherein said sleeve is press-fit on an outer circumferential surface of said valve assembly.

6. A fuel injection valve as claimed in claim 1, wherein said sleeve is welded to an outer circumferential surface of said valve assembly.

7. A fuel injection valve as claimed in claim 1, wherein said sleeve is caulked against an outer circumferential surface of said valve assembly.

8. A fuel injection valve as claimed in claim 1, further comprising a highly heat conductive material (55) filled within a space defined within said sleeve by said valve assembly and said housing.

9. A fuel injection valve as claimed in claim 1, wherein said sleeve is heat-resistive and erosion-resistive.

10. A fuel injection valve as claimed in claim 1, wherein said one side of said seal ring in abutment against one end of said sleeve is positioned radially inward of said opposite side of said seal ring adapted to be abut against said shoulder portion of said fuel injection valve insertion hole.

11. A fuel injection valve as claimed in claim 1, wherein said seal ring comprises a metal ring having a substantially S-shaped cross-section.

12. A fuel injection valve as claimed in claim 1, wherein said seal ring comprises a plated tin surface layer.

13. A fuel injection valve as claimed in claim 1, wherein said seal ring comprises a projection substantially radially inwardly extending from an inner circumferential surface of said seal ring and elastically engaging with said valve assembly.

* * * * *